UNITED STATES PATENT OFFICE.

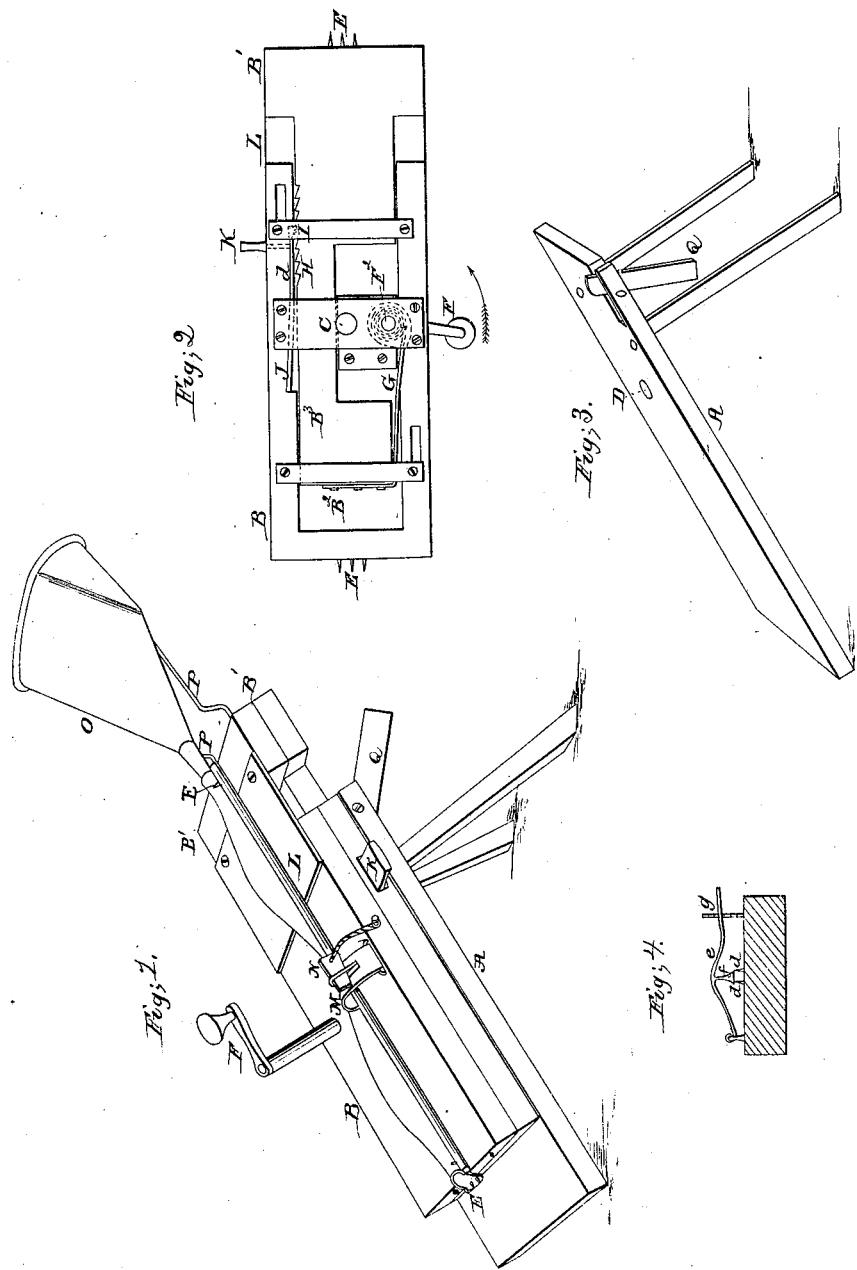

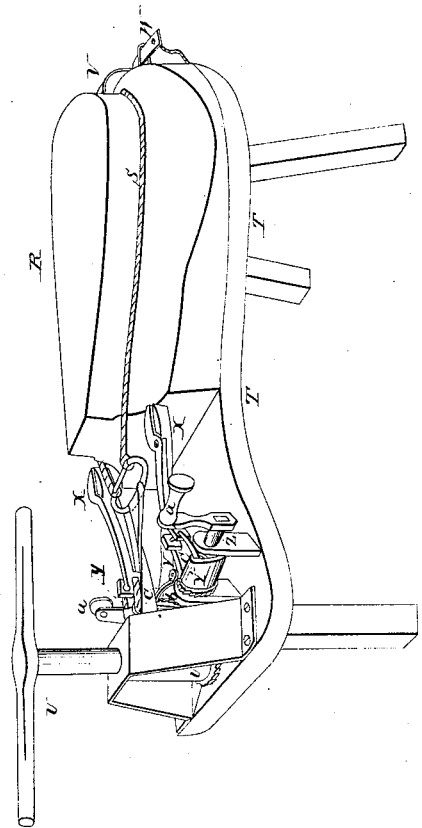

ANSEL BENHAM, OF BELVIDERE, ILLINOIS.

BLOCK FOR HORSE-COLLARS.

Specification of Letters Patent No. 5,464, dated March 8, 1848.

*To all whom it may concern:*

Be it known that I, ANSEL BENHAM, of Belvidere, Boone county, State of Illinois, have invented a new and useful Improvement in Machines for Stuffing and Blocking Horse-Collars, which is described as follows, reference being had to the annexed drawings of the same, making part of this specification.

Figure 1 is a perspective view of the machine for stuffing the horse collar. Fig. 2 is a plan of the under side of the revolving extension stuffing board upon which the collar is extended to be stuffed. Fig. 3 is a perspective view of the bench detached. Fig. 4 is a view of another mode of holding the collar. Fig. 5 is a perspective view of the collar block upon which the collar is shaped.

The nature of this invention and improvement consists in a peculiar manner of constructing an inclined extension swivel board sustained upon an inclined bench resting upon four legs to which board the collar is fastened at the middle and ends in any convenient way while being stuffed at one end the board being swiveled around or turned end for end in order to stuff the opposite end, the collar being subsequently blocked and formed on the block R—being an improvement on the mode patented by Wade Haworth in 1845.

A is an inclined bench on which is placed the revolving extension stuffing board and its appendages.

B is the stuffing board upon which the collar to be stuffed is stretched, made in two parts the one sliding within the other by mortise and tenon.

C is the pivot on which the mortised section of the stuffing board turns.

D is a round hole in the inclined bench in which the pivot turns.

$B^2$ is a mortise made in the under side of the board to admit a tongue $B^3$ of a longitudinal sliding section B' of the board which is connected with the mortised section and made to slide longitudinally from or toward the center in order to lengthen or shorten the stuffing board.

E are pins inserted into the ends of the stuffing board to which the ends of the collar are made fast. The pins may be inserted in the upper surface of the board and a gripping lever used hereafter described for holding the ends of the collar. See Fig. 4.

F is a crank axle for extending the movable section of the stuffing board.

G is a flexible strap made fast by one of its ends to the inner end of the sliding section B', of the board while the other end is made fast to the axle $F^2$, so that when the axle is turned the strap is wound upon it and the movable section of the board pushed out or extended.

H is a rack and I is a pawl for holding the extension portion of the bench at any desired place or distance—the rack H being fastened to the side of the said sliding part of the board and the pawl I fastened to the mortised part B of the board being kept in gear with the rack by a spring J.

K is a screw for moving the pawl in and out of gear with the rack.

L is an apron for covering the space which will exist between the fixed and sliding sections of the board when the latter is drawn out or extended. This apron is attached to the sliding section B'.

M is a hinged dog for holding the collar in the center of the board and at the center of the collar.

N is a key for holding the dog hard down upon the collar.

O is the funnel for containing the straw or other article to be stuffed into the collar.

P are arms projecting from the funnel and made to enter corresponding holes in the sliding end of the table. This funnel can be applied to either end of the stuffing table.

Q is a turning catch for holding the revolving stuffing board upon the inclined table in the position desired.

The implement used to push the straw from the funnel into the collar is a forked rod with a handle which is laid hold of by the operator. A convenient mode of holding the ends of the collar during the operation of stuffing is by the use of the combination of pins $d$, lever $e$, cog $f$, and notched post $g$—the end of the collar being laid upon the pins $d$ and the cog $f$ brought down upon it by the lever and made fast to the notched post $g$.

R is the collar block for shaping the collar. This block is made with semioval projections S corresponding in size and shape with the usual crease or cavity on the inside of the collar between the rim and the swelled portions of the collar where it is usually stitched and is designed to fit that crease or cavity and hold the collar firmly on the inside while undergoing the operation of being hammered and shaped on the former or block.

T is the bench for supporting the block.

U is a windlass for drawing the creasing rope around the collar for shaping the collar and forming the curved depressions or crease for the hames.

V is a dog for holding the collar at the center.

W is a key for holding the dog.

X are pincers for taking hold of the ends of the collar for drawing it around the block.

Y are straps for closing the pincers.

Z are axles for winding the straps for closing the pincers and drawing the collar around the block.

$a\ a$ are cranks for turning the axles.

$b\ b$ are ratchet wheels on the crank axles.

$c$ is one of the pawls working into one of said wheels $b$ for holding the axle, the corresponding pawl on the opposite side of the bench not being shown.

Operation: The collar being sewed in the usual manner is attached by its ends to the pins in the ends of the extension stuffing board; or to the pins in the top of the board and gripped by the lever; or by other means. The crank axle is then turned until the collar be sufficiently stretched. The dog or lever is then brought down upon the collar and secured at the center. Then stuff the rim (without the use of the funnel). Then attach the funnel and stuff one belly. Then turn the board and stuff at the other end the other belly. Then spring the dog from the rack and run or push in the slide. Then remove the collar from the board to the block and secure the collar by the dog applied at the center of the throat. Then with a hammer or mallet turn the collar around the block. Then apply the pincers to the ends of the collar and draw it up snug around the block. Then apply the rope and draw it around the collar to form the crease for the hames. The collar is then hammered to its required shape.

I do not claim to be the first inventor of the inclined turning board upon which to stuff horse collars as this has been already patented. Nor do I claim the block or former for blocking the collar; but What I do claim as my invention and desire to secure by Letters Patent is—

The manner of constructing the extension stuffing board and of operating the same for the purpose above set forth—that is to say I claim the combination of the sliding section $B'$ of the stuffing board with the turning section B and strap G and windlass F the sliding section being made with a tongue $B^3$ and the section B with a mortise $B^2$ within which the tongue $B^3$ slides back and forth in extending and contracting the same.

ANSEL BENHAM.

Witnesses:
 WM. P. ELLIOT,
 A. E. H. JOHNSON,